US011287781B2

(12) United States Patent
Castellani et al.

(10) Patent No.: US 11,287,781 B2
(45) Date of Patent: Mar. 29, 2022

(54) TURBOPROPELLER ENGINE CONTROL SYSTEM AND METHOD, PROVIDING OPTIMIZED EFFICIENCY

(71) Applicant: GE Avio S.r.l., Rivalta di Torino (IT)

(72) Inventors: Simone Castellani, Viareggio (IT); Giuseppe Donini, Villanova d'Asti (IT); Pierpaolo Forte, Noicattaro (IT); Cristian Lai, Bari (IT)

(73) Assignee: GE AVIO S.R.L., Rivalta di Torino (IT)

( * ) Notice: Subject to any disclaimer, the term of this patent is extended or adjusted under 35 U.S.C. 154(b) by 276 days.

(21) Appl. No.: 16/485,031

(22) PCT Filed: Feb. 16, 2018

(86) PCT No.: PCT/EP2018/053948
§ 371 (c)(1),
(2) Date: Aug. 9, 2019

(87) PCT Pub. No.: WO2018/150003
PCT Pub. Date: Aug. 23, 2018

(65) Prior Publication Data
US 2019/0384234 A1 Dec. 19, 2019

(30) Foreign Application Priority Data
Feb. 17, 2017 (EP) .................... 17425017

(51) Int. Cl.
*B64C 11/30* (2006.01)
*F02C 9/58* (2006.01)
(Continued)

(52) U.S. Cl.
CPC ............ *G05B 13/021* (2013.01); *B63H 3/10* (2013.01); *B64C 11/305* (2013.01); *F02C 9/58* (2013.01);
(Continued)

(58) Field of Classification Search
CPC ....... B64C 11/305; F02C 9/58; G05B 13/021; B63H 3/10; F04D 29/563; B63D 2033/0293
See application file for complete search history.

(56) References Cited

U.S. PATENT DOCUMENTS

| 2003/0126862 A1 | 7/2003 | Peplow et al. |
| 2007/0110577 A1 | 5/2007 | Danielson |
| 2014/0023499 A1 | 1/2014 | Collingbourne |

FOREIGN PATENT DOCUMENTS

| EP | 1787906 A2 | 5/2007 |
| WO | WO03/046352 A1 | 6/2003 |
| WO | WO2012/131373 A1 | 10/2012 |

OTHER PUBLICATIONS

PCT International Search Report Corresponding to PCT/EP2018/053948 dated Apr. 10, 2018.

*Primary Examiner* — Richard A Edgar
(74) *Attorney, Agent, or Firm* — Fitch, Even, Tabin & Flannery LLP (57) ABSTRACT

An electronic control system (30) for a turbopropeller engine (1) having a gas turbine (2, 4, 5, 6) and a propeller (7), coupled to the gas turbine, the control system (10) having a propeller control unit (14) and a turbine control unit (15) to jointly control engine power output based on an input request (PLA), wherein the propeller control unit (14) has a first reference generator (16), to determine a reference propeller speed ($N_{pref}$) based on the input request (PLA), and a first regulator (19), to regulate a propeller speed ($N_p$). The propeller control unit (14) has a reference correction stage (31) to apply a correction to the reference propeller speed ($N_{pref}$) and generate thereby a corrected reference propeller speed (I), and the first regulator (19) regulates the propeller speed ($N_p$) based on the corrected reference propeller speed (I) to achieve optimized efficiency.

20 Claims, 5 Drawing Sheets (51) Int. Cl.
  *G05B 13/02* (2006.01)
  *F04D 29/56* (2006.01)
  *B63H 3/10* (2006.01)
  *B64D 33/02* (2006.01)
(52) U.S. Cl.
  CPC .... *F04D 29/563* (2013.01); *B64D 2033/0293* (2013.01)

TURBOPROPELLER ENGINE CONTROL SYSTEM AND METHOD, PROVIDING OPTIMIZED EFFICIENCY

PRIORITY CLAIM

This application claims priority from European Application No. 17425017.5 filed on Feb. 17, 2017, the disclosure of which is incorporated by reference.

TECHNICAL FIELD

The present solution relates to a control system and method for a turbopropeller (or turboprop) engine of an aircraft.

BACKGROUND ART

Figure 1:
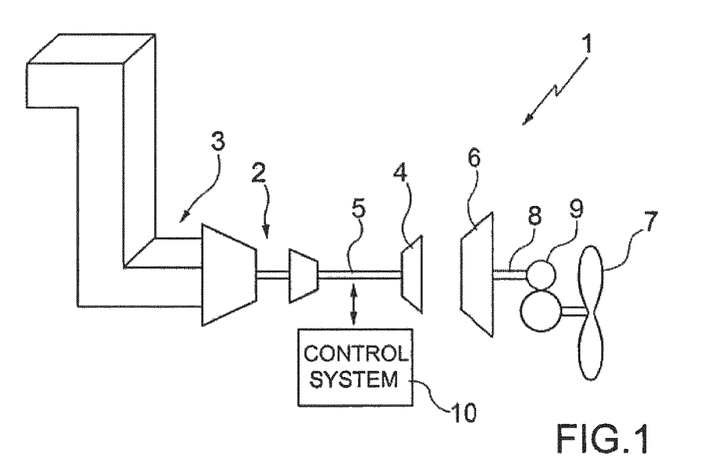
FIG. 1 is a schematic diagram of a turbopropeller engine, of a known type.

As it is known, and as schematically shown in FIG. 1, a turbopropeller engine 1 includes a gas turbine, a gearbox and a propeller system.

In particular, the gas turbine generally comprises:
axial/centrifugal compressors 2, coupled to an air intake 3;
a high-pressure turbine 4, coupled to the axial/centrifugal compressors 2 via a gas generator shaft 5;
a low-pressure turbine 6, so called "power turbine", mechanically decoupled from the gas generator shaft 5 and driven by hot gas expansion.

The propeller system 7 is coupled to the power turbine 6 via a power shaft 8 and gearbox 9.

The turbopropeller engine 1 is managed by an automatic electronic control system 10, that includes an electronic processing unit (e.g. a microprocessor, a microcontroller, or similar processing unit) provided with a non-volatile memory storing suitable software instructions, in order to implement an engine control strategy to meet an input power demand, originated from a pilot's lever.

In particular, on dual-lever controlled turbopropeller engines, having separate propeller and turbine conditioning levers, the pilot is expected to compute an optimal propeller speed by using published engine/propeller performance maps and to set such manually computed speed with the propeller conditioning lever.

Clearly, this approach entails a high workload for the pilot, especially during critical and safety-related aircraft manoeuvers.

On single-lever controlled turbopropeller engines, the pilot sets at the same time torque (or thrust) and speed requirements with a single conditioning lever. The propeller speed is a function of the lever angular position, according to a predetermined schedule being developed to operate the propeller as close as possible to an optimal operating point, assuming a typical aircraft mission.

Figure 2:
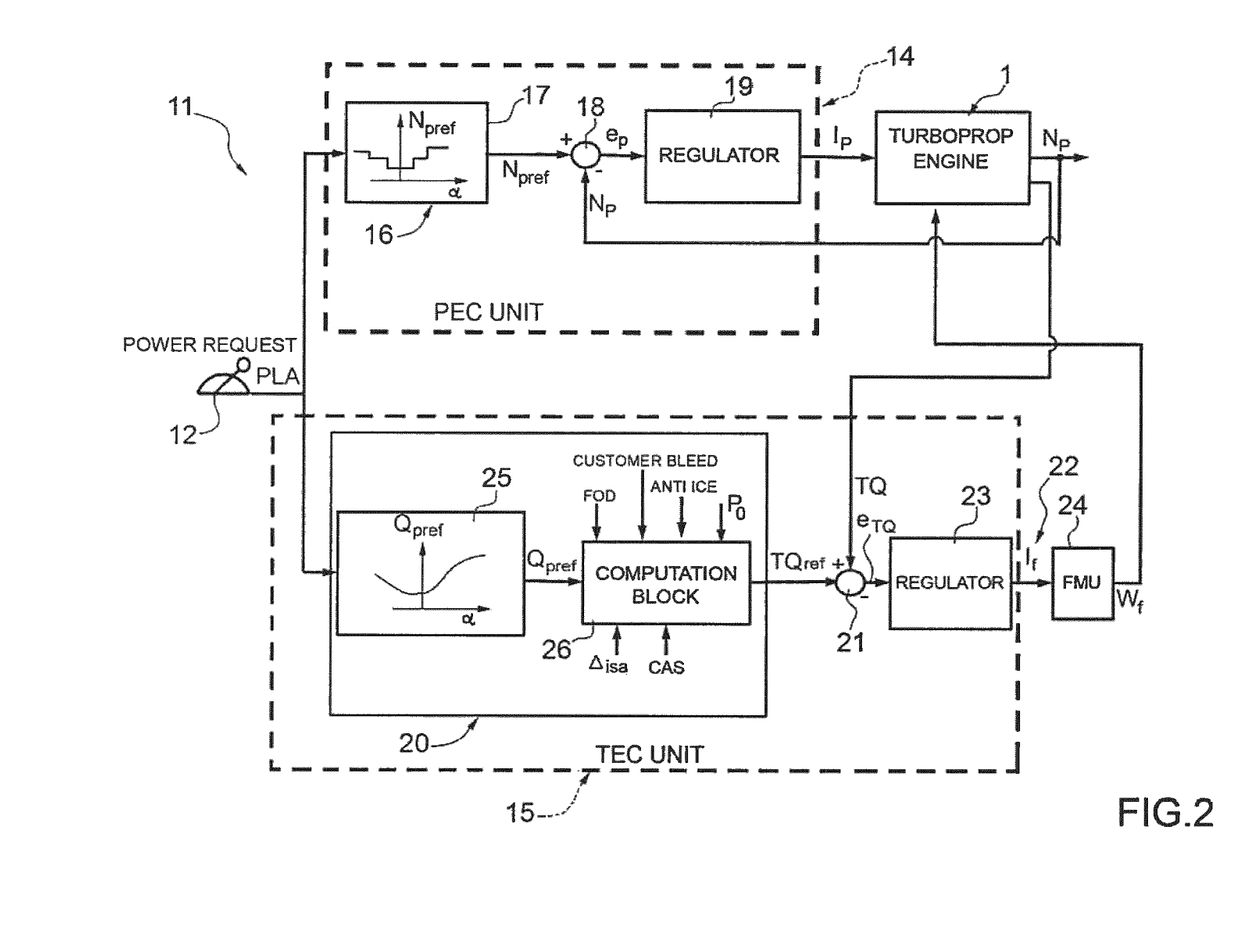
FIG. 2 is a schematic block diagram of a known control system of the turbopropeller engine according to a known solution.

FIG. 2 shows a schematic diagram of a control system, generally denoted with 11, of a turbopropeller engine (such as the turbopropeller engine 1 shown in FIG. 1), receiving a signal PLA indicative of an input power request, in particular indicative of the positioning angle of a single conditioning lever 12.

Control system 11 implements the functions of a propeller electronic control (PEC) unit 14 and a turbine electronic control (TEC) unit 15.

In particular, the TEC unit 15 is designed to adjust fuel flow $W_f$ to control the engine torque (or thrust), while the PEC unit 14 is designed to adjust propeller blade angle to control the propeller speed $N_p$. The two control units are closely coupled; indeed, as the fuel flow $W_f$ is being adjusted, the propeller speed $N_p$ is affected, and a change in the blade angle directly affects the engine torque.

In more details, the PEC unit 14 comprises:
a first reference generator 16, including a first scheduler 17 configured to receive the input signal PLA and to determine a value of a reference propeller speed $N_{pref}$ corresponding to the positioning angle α of the conditioning lever 12, according to a preset schedule that characterizes the turbopropeller engine operation (e.g. provided by the manufacturer and stored in the non-volatile memory of the processing unit of the electronic control system 10).

a first adder block 18, receiving at a first (positive, or summation) input the reference propeller speed $N_{pref}$ and at a second (negative, or subtraction) input a measured propeller speed $N_p$, as a feedback, measured by a suitable sensor coupled to the turbopropeller engine 1, and providing at the output a propeller speed error $e_p$, as a function of the subtraction between the reference propeller speed $N_{pref}$ and the measured propeller speed $N_p$;

a first regulator 19, receiving at its input the propeller speed error $e_p$ and generating at its output, based on a regulation scheme aimed at minimizing the same propeller speed error $e_p$, a first driving quantity $I_P$, for example an electrical current, that is supplied to the turbopropeller engine 1 (e.g. to a servo-valve thereof) to control the angle (or pitch) of the propeller blades, in order to regulate the value of the propeller speed $N_p$.

The PEC unit 14 thus implements a first closed loop control, aimed at controlling the propeller speed $N_p$ based on a scheduled reference and a feedback measured propeller speed $N_p$.

The TEC unit 15 in turn comprises:
a second reference generator 20, configured to receive the input signal PLA and to determine a value of a reference engine torque $TQ_{ref}$ corresponding to the positioning angle α of the conditioning lever 12 and depending on environment conditions;

a second adder block 21, receiving at a first (positive, or summation) input the reference engine torque $TQ_{ref}$ and at a second (negative, or subtraction) input a measured engine torque TQ, as a feedback, measured by a suitable sensor coupled to the turbopropeller engine 1, and providing at the output a torque error $e_{TQ}$, as a function of the subtraction between the reference engine torque $TQ_{ref}$ and the measured engine torque TQ;

a second regulator 23, receiving at its input the torque error $e_{TQ}$ and generating at its output, based on a regulation scheme aimed at minimizing the same torque error $e_{TQ}$, a second driving quantity $I_f$, for example an electrical current, that is supplied to a fuel metering unit 24 to control the fuel flow $W_f$ to the gas turbine of the turbopropeller engine 1, in order to regulate the value of the engine torque TQ (the second regulator 23 and fuel metering unit 24 thus defining a fuel control block 22).

The TEC unit 15 thus implements a second closed loop control, aimed at controlling the engine torque TQ based on a scheduled reference and a feedback measured engine torque TQ.

In more details, and as shown in the same FIG. 2, the second reference generator 20 comprises:
a second scheduler 25, configured to receive the input signal PLA and to determine a value of a reference propeller torque $Q_{pref}$ (at ISA, International Standard Atmosphere, standard sea level condition and zero airspeed) corresponding to the positioning angle α of the conditioning lever 12, according to a preset schedule that characterizes the engine operation (e.g. again provided by the manufacturer and stored in the non-volatile memory of the processing unit of the electronic control system 10);

a computation block 26, configured to receive the reference propeller torque $Q_{pref}$ (at ISA standard conditions) and to generate a corresponding value of reference engine torque $TQ_{ref}$, taking also into account a number of environmental parameters, among which may be aircraft air speed CAS, temperature deviation $\Delta_{isa}$ with respect to the standard ISA and external pressure $P_0$, and FOD (Foreign Object Damage) bulkheads status, Customer Bleed and Anti Ice status (as selected by the pilot).

The discussed control solution entails a reduced workload for the pilot and an increased overall safety; however, the Applicant has realized that this solution does not generally allow optimization of the engine/propeller efficiency, and in particular allow reaching a most efficient operating point in all possible conditions.

DISCLOSURE OF INVENTION

The aim of the present solution is to provide an improved control solution for the turbopropeller engine, allowing to achieve efficiency optimization.

According to the present solution, a control system and method are therefore provided, as defined in the appended claims.

BRIEF DESCRIPTION OF THE DRAWINGS

For a better understanding of the present invention, preferred embodiments thereof are now described, purely as non-limiting examples, with reference to the attached drawings, wherein.

BEST MODE FOR CARRYING OUT THE INVENTION

The present solution originates from the Applicant's realization that, for a given propeller power (torque or thrust) setting, and aircraft speed (advancing speed), it is possible to determine an optimized propeller speed that allows maximizing of the turbopropeller engine efficiency.

An aspect of the proposed control system therefore envisages, in a control solution of the type discussed with reference to FIG. 2, a proper correction to the reference propeller speed $N_{pref}$ aimed at achieving a propeller speed $N_p$ matching the determined optimized propeller speed and therefore an optimized efficiency.

A further aspect of the proposed control system moreover envisages a proper correction to the reference engine torque $TQ_{ref}$, to compensate for the reference propeller speed correction, in order to maintain the power setting, while modulating the reference propeller speed $N_{pref}$ to operate the propeller 7 at its maximum efficiency.

As will be disclosed in detail, the (corrected) propeller speed reference is thus treated as an optimized output of the control system, instead of a pre-determined, scheduled, "quasi" optimized input (as in the traditional control solution, as shown in FIG. 2).

Figure 3:
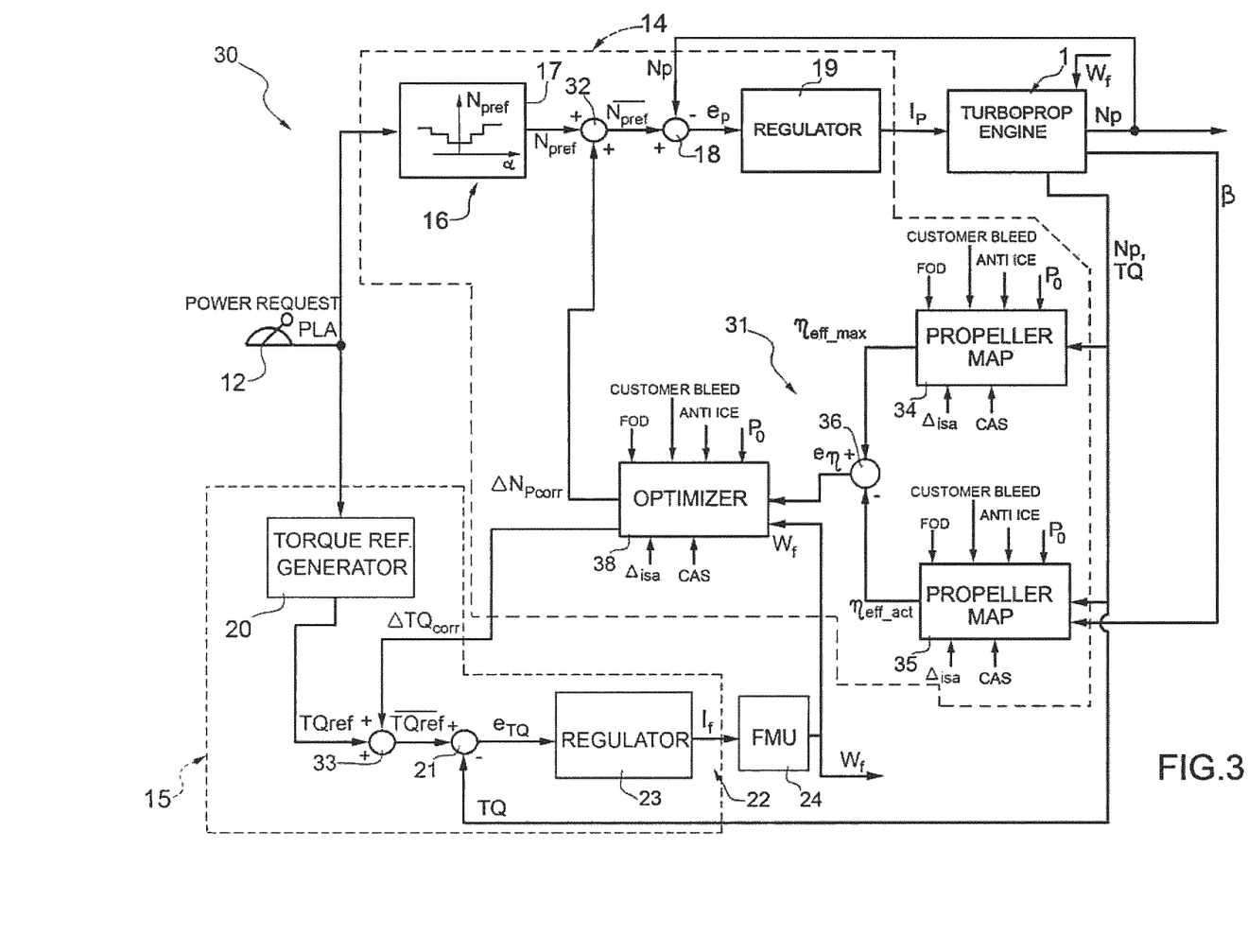
FIG. 3 is a schematic block diagram of a control system of a turbopropeller engine according to the present solution.

In more detail, and with reference to FIG. 3, a control system 30 according to an embodiment of the present solution implements, as the control system 11 of FIG. 2, a propeller electronic control (PEC) unit, again denoted with 14, and a turbine electronic control (TEC) unit, again denoted with 15, both receiving the input signal PLA from the single conditioning lever 12, and operatively coupled to jointly control engine operation.

As already discussed with reference to FIG. 2 (and as will not be discussed again in detail), the PEC unit 14 comprises:

the first reference generator 16, including the first scheduler 17 configured to receive the input signal PLA and to determine a value of the reference propeller speed $N_{pref}$ corresponding to the positioning angle α of the conditioning lever 12, according to a preset schedule that characterizes the engine operation; and the first regulator 19, coupled to the first adder block 18, and configured to generate at its output, based on the propeller speed error $e_p$, the first driving quantity $I_P$, for example an electrical current, that is supplied to the turbo propeller engine 1 to control the angle (or pitch) of the propeller blades, here denoted with β, in order to regulate the value of the propeller speed $N_p$.

According to the present solution, the PEC unit 14 further comprises a reference correction stage 31, which is configured to generate a reference speed correction $\Delta N_{pcorr}$ that is supplied to a third adder block 32, in order to properly correct the reference propeller speed $N_{pref}$ determined by the first reference generator 16, so as to achieve, at the output of the first regulator 19, a propeller speed $N_p$ matching the optimized propeller speed.

The third adder block 32 thus receives at a first (positive, or summation) input the reference propeller speed $N_{pref}$ and at a second (in this case, also positive or summation) input the reference speed correction $\Delta N_{pcorr}$, and provides at the output a corrected reference propeller speed $\overline{N_{pref}}$.

This corrected reference propeller speed $\overline{N_{pref}}$ is then supplied to the positive input of the first adder block 18, which outputs the propeller speed error $e_p$ to the first regulator 19, as the result of the difference between the same corrected reference propeller speed $\overline{N_{pref}}$ and the feedback measured propeller speed $N_p$.

The PEC unit 14 thus implements a first closed loop control, aimed in this case at controlling the propeller speed $N_p$ so that its value matches the optimized propeller speed that allows maximizing of engine efficiency.

The TEC unit 15 comprises:

the second reference generator 20, configured to receive the input signal PLA and to determine a value of the reference engine torque $TQ_{ref}$; and the second regulator 23, coupled to the second adder block 21, and configured to generate at its output, based on the torque error $e_{TQ}$, the second driving quantity $I_f$, that is supplied to the fuel metering unit 24 to control the fuel flow $W_f$ to the gas turbine of the turbopropeller engine 1, in order to regulate the value of the engine torque TQ (the second regulator 23 and fuel metering unit 24 defining the fuel control block 22).

According to an aspect of the present solution, the reference correction stage 31 of the PEC unit 14 is further configured to generate a reference torque correction $\Delta TQ_{corr}$ that is supplied to a fourth adder block 33, in order to properly correct the reference engine torque $TQ_{ref}$ determined by the second reference generator 20, to achieve, at the output of the fuel control block 22, a fuel flow $W_f$ that allows to maintain the power setting, while the reference propeller speed $N_{pref}$ is modulated to operate the propeller 7 at its maximum efficiency. The reference torque correction $\Delta TQ_{corr}$ is thus determined to generate a corresponding torque variation compensating for the correction to the propeller speed $N_p$, so that the power output does not change.

The fourth adder block 33 receives at a first (positive, or summation) input the reference engine torque $TQ_{ref}$ and at a second (in this case, also positive or summation) input the reference torque correction $\Delta TQ_{corr}$, and provides at the output a corrected reference engine torque $\overline{TQ_{ref}}$.

This corrected reference engine torque $\overline{TQ_{ref}}$ is then supplied to the positive input of the second adder block 21, which outputs the torque error $e_{TQ}$ to the second regulator 23, as the result of the difference between the same corrected reference engine torque $\overline{TQ_{ref}}$ and the measured torque TQ.

The TEC unit 15 thus implements a second closed loop control, aimed in this case at controlling the engine torque TQ so as to maintain the power setting, while the reference propeller speed $N_{pref}$ is varied to operate the propeller 7 at its maximum efficiency.

In more details, and as shown in the same FIG. 3, the reference correction stage 31 of the PEC unit 14 comprises a first and a second propeller-map processing blocks 34, 35 receiving measures of the propeller speed $N_p$ and engine torque TQ from suitable sensors coupled to the turbopropeller engine 1 and taking also into account a number of environmental parameters, among which may be aircraft air speed CAS, temperature deviation $\Delta_{isa}$ with respect to the standard ISA and external pressure $P_0$, and FOD (Foreign Object Damage) bulkheads status, Customer Bleed and Anti Ice.

The second propeller-map processing block 35 moreover receives a measure of the propeller blade angle (or pitch) β, again from a suitable sensor coupled to the propeller 7.

In particular, the first propeller-map processing block 34 is configured to determine, based on the measured operating point of the turbopropeller engine 1 (determined by the $N_p$ and TQ measures) and the above additional parameters, a maximum, theoretical or ideal, efficiency $\eta_{eff\_max}$ available to the propeller 7 at propeller speed $N_p$.

The second propeller-map processing block 35, in turn, is configured to determine, based on the measured operating point of the turbopropeller engine 1 and the environmental parameters, and also taking into account the actual measured value of the propeller blade angle β, the actual efficiency $\eta_{eff\_act}$ of the operating propeller 7.

Both the first and the second propeller-map processing blocks 34, 35 are configured to determine the respective efficiency values based on a performance map of the propeller 7 of the turbopropeller engine 1, which provides indications of the propeller performance at various operating conditions. The performance map may be provided by the propeller manufacturer and/or determined via tests and simulations, and may be stored (e.g. in the non-volatile memory of the processing unit of the electronic control system 30), for example as a look-up table or as a function, or group of functions.

Figure 4:
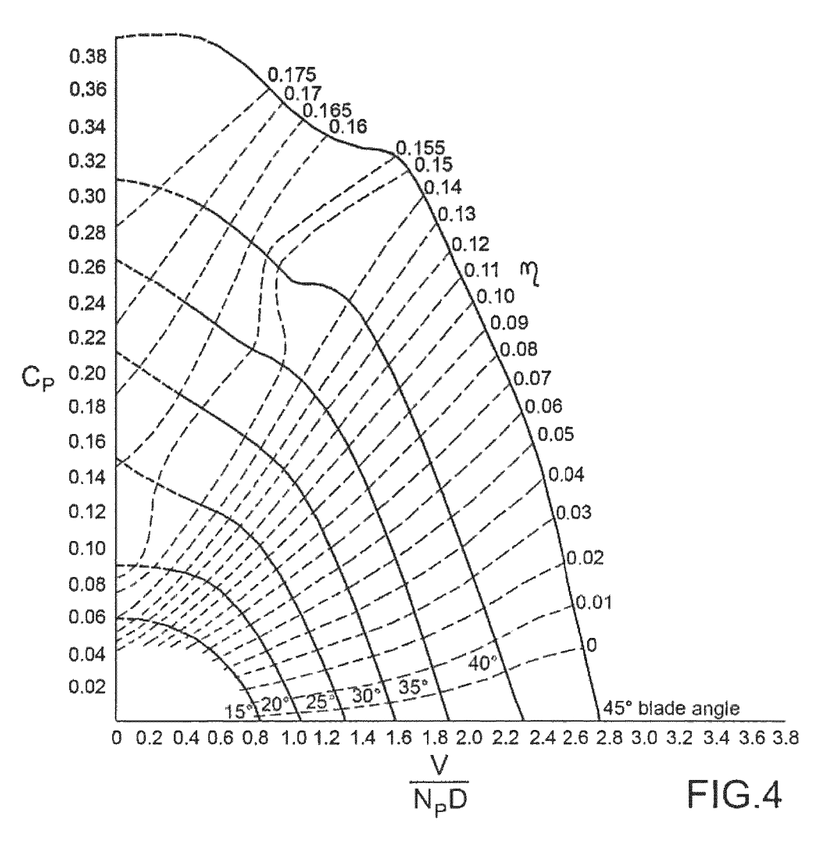
FIG. 4 is a plot related to a performance map of a propeller in the turbopropeller engine.

As an example, FIG. 4 shows an exemplary propeller performance map, which characterizes propeller performance in terms of the power coefficient $C_p$ as a function of the advance ratio $J=V/N_p \cdot D$, where V is here the aircraft speed, and D is the diameter of the propeller 7, at different values of the blade angle β; the values of the propeller efficiency η ($\eta=J \cdot (C_t/C_p)$, $C_t$ being the thrust coefficient) are shown in the curves at the various operating points.

The reference correction stage 31 of the PEC unit 14 further comprises a fifth adder block 36 and an optimizer block 38.

The fifth adder block 36 has a first (positive, or summation) input coupled to the first propeller-map processing block 34 to receive the determined maximum efficiency $\eta_{eff\_max}$, and a second (negative or subtraction) input coupled to the second propeller-map processing block 35 to receive the determined actual efficiency $\eta_{eff\_act}$, and provides at its output an efficiency error $e_\eta$, as a function of the difference between the maximum efficiency $\eta_{eff\_max}$ and actual efficiency $\eta_{eff\_act}$ values.

The optimizer block 38 receives the above efficiency error $e_\eta$, and is configured to determine, based on the same efficiency error $e_\eta$, the above discussed reference speed correction $\Delta N_{pcorr}$ and reference torque correction $\Delta TQ_{corr}$, for correcting the reference propeller speed $N_{pref}$ and, respectively, the reference engine torque $TQ_{ref}$.

In particular, the optimizer block 38 iteratively (i.e. with subsequent optimization iterative steps) determines the reference speed correction $\Delta N_{pcorr}$ and reference torque correction $\Delta TQ_{corr}$ (amplitude and sign thereof) based on the actual fuel flow $W_f$ at the output of the fuel control block 22, and environmental parameters, among which are aircraft air speed CAS, temperature deviation $\Delta_{isa}$, external pressure $P_0$, and FOD (Foreign Object Damage) bulkheads status, Customer Bleed and Anti Ice parameters.

The optimizer block 38 operates so that, given the power request and the environmental condition, the iteratively applied correction to the reference propeller speed $N_{pref}$ determines a progressive reduction of the efficiency error $e_\eta$, and the iterative process ends when: the efficiency error $e_\eta$ is lower than a threshold, meaning that the value of the actual efficiency $\eta_{eff\_act}$ is substantially equal to the available maximum efficiency $\eta_{eff\_max}$; or the reference speed correction $\Delta N_{pcorr}$ has overcome a maximum allowable value (e.g. 10% of the propeller speed $N_p$). The threshold may be fixed or variable, and may be determined via tests and simulations.

The applied reference torque correction $\Delta TQ_{corr}$ is such that the power setting is maintained substantially constant while the propeller speed $N_p$ is varied to reach the maximum efficiency condition, thus compensating the applied propeller correction.

The advantages of the present solution are clear from the previous discussion.

In particular, it is again underlined that the present solution allows to fully exploit the advantages of single-lever control (among which the reduced workload for the pilot), while at the same time guaranteeing at all times an optimized efficiency for the engine/propeller.

Moreover, the power settings requested by the pilot (via the single power lever) are advantageously maintained and preserved during the operation at the maximum efficiency operating points.

Figure 5A:
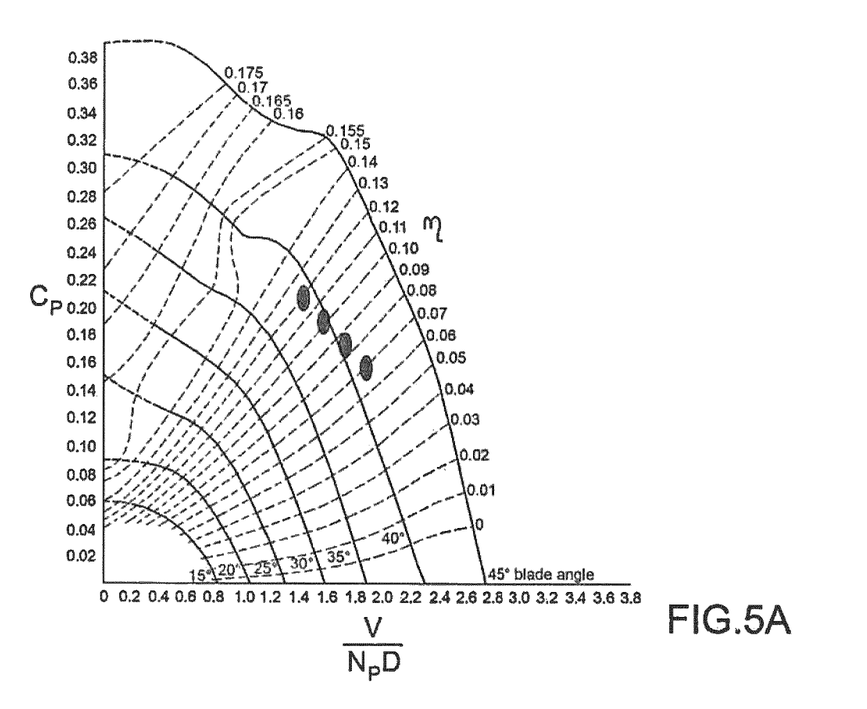
FIGS. 5A and 5B show plots related to operating points in a performance map of a propeller in the turbopropeller engine according to the known control system (FIG. 5A) and according to the control system of the present solution (FIG. 5B)
Figure 5B:
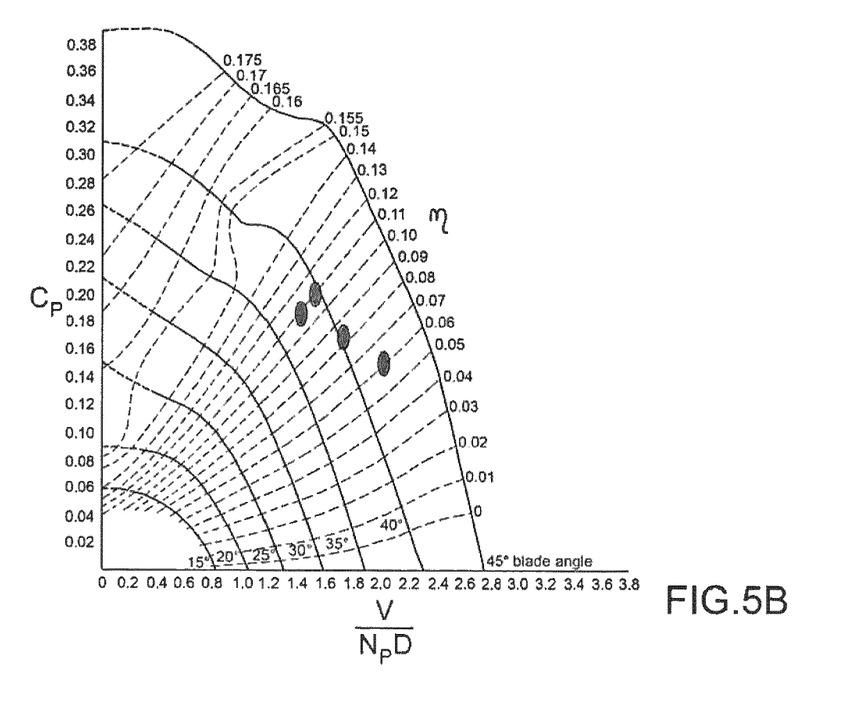

The comparison between the propeller map of FIG. 5A (relating to a traditional control solution) and that of FIG. 5B (relating to the present solution) shows how the present solution allows operation of the turbopropeller engine 1 at the most efficient points on the map.

Finally, it is clear that modifications and variations can be made to what is described and illustrated herein, without thereby departing from the scope of the present invention as defined in the appended claims.

In particular, it is underlined that the control system 10 may envisage a thrust control loop, instead of a torque control loop, jointly operating with the propeller speed control loop, in order to control and maintain the power setting and achieve optimized efficiency.

Figure 6:
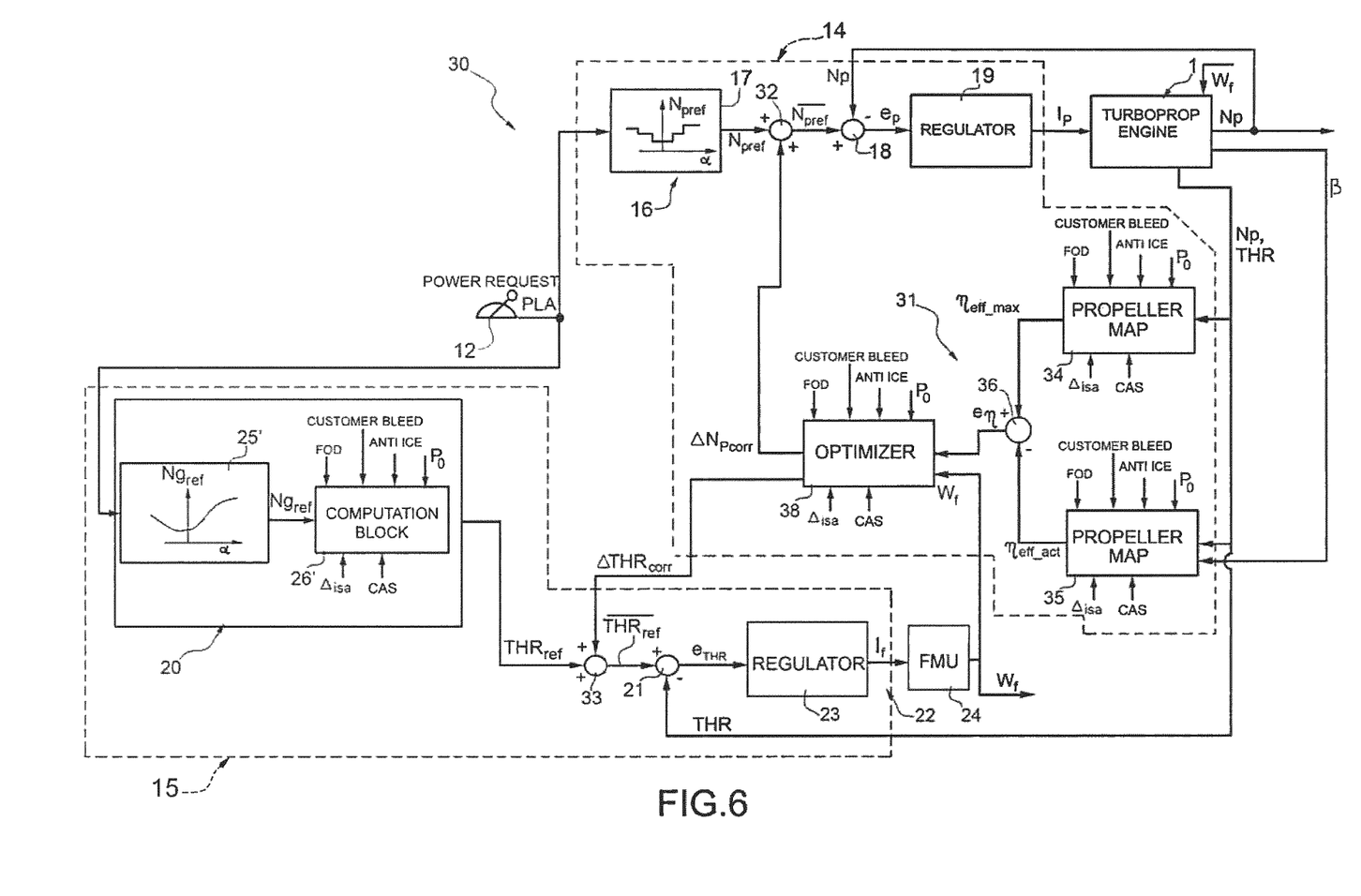
FIG. 6 is a schematic block diagram of a further embodiment of the control system.

In this respect, FIG. 6 shows the control system, again denoted with 30, according to a further embodiment of the present solution, envisaging a thrust control loop.

This control system differs from the one discussed with reference to FIG. 3 in that the second scheduler, here denoted with 25', in the TEC unit 15 is configured to receive the input signal PLA and to determine, in this case, a value of a reference core engine speed $N_{gref}$ corresponding to the positioning angle α of the conditioning lever 12, according to a preset schedule that characterizes the engine operation.

The computation block, here denoted with 26' in the same TEC unit 15 is configured to receive the reference core engine speed $N_{gref}$ and generate a corresponding value of a reference engine thrust $THR_{ref}$, taking also into account the environmental parameters, among which may be: aircraft air speed CAS, temperature deviation $\Delta_{isa}$, external pressure $P_0$, and FOD (Foreign Object Damage) bulkheads status, Customer Bleed and Anti Ice parameters.

In this embodiment, the optimizer block 38 is thus configured to determine a reference thrust correction $\Delta THR_{corr}$, in order to maintain the power setting during the propeller speed modulation, and the second regulator 23 operates based on a corrected value of the reference engine thrust $\overline{THR_{ref}}$ and associated thrust error $e_{THR}$.

As shown in the same FIG. 6, in this embodiment, the first and second propeller-map processing blocks 34, 35 operate based on a measured engine thrust THR (instead of a measured torque).

The general operation of the control system 30 does not, however, differ from what previously discussed, again envisaging correction of the reference propeller speed $N_{pref}$ to reduce the efficiency error $e_\eta$, and the correction, in this case of the reference engine thrust $THR_{ref}$, so that the power setting is maintained substantially constant while the propeller speed $N_p$ varies in order to reach the maximum efficiency condition.

The present Applicant has found that holding thrust, instead of torque, to preserve the power setting while determining optimal propeller speed, may be advantageous, in certain operating conditions, to further improve the engine efficiency.

The invention claimed is:

1. An electronic control system for a turbopropeller engine having a gas turbine and a propeller, coupled to the gas turbine, the control system comprising a propeller control unit and a turbine control unit configured to jointly control engine power output based on an input request,
wherein the propeller control unit comprises a first reference generator, configured to determine a reference propeller speed based on the input request, and a first regulator, configured to regulate a propeller speed,
wherein the propeller control unit further comprises a reference correction stage configured to correct the reference propeller speed and generate thereby a corrected reference propeller speed, and in that the first regulator is configured to regulate the propeller speed based on the corrected reference propeller speed to achieve optimized efficiency,
wherein the reference correction stage of the propeller control unit is configured to determine an available maximum efficiency and an actual efficiency, based on a measured engine operating point and environmental parameters, and
to determine a reference speed correction to correct the reference propeller speed based on an efficiency error being a function of a difference between the maximum efficiency and actual efficiency values.

2. The control system according to claim 1, wherein the engine operating point is determined by measures of propeller speed and of engine torque or thrust, and the environmental parameters comprise a measure of an aircraft speed of an aircraft.

3. The control system according to claim 1, wherein the turbine control unit comprises a second reference generator, configured to determine a reference quantity based on the input request, and a second regulator, configured to regulate a fuel flow to the gas turbine; wherein the reference correction stage is further configured to correct the reference quantity and generate thereby a corrected reference quantity, and the second regulator is configured to regulate the fuel flow based on the corrected reference quantity.

4. The control system according to claim 3, wherein the input request is indicative of a power setting; and the corrected reference quantity is configured to compensate for correction of the propeller speed and thereby maintain the power setting while the propeller speed is corrected to achieve optimized efficiency.

5. The control system according to claim 3, wherein the reference quantity is the engine torque and the corrected reference quantity is a corrected reference engine torque.

6. The control system according to claim 3, wherein the reference quantity is the engine thrust and the corrected reference quantity is a corrected reference engine thrust.

7. The control system according to claim 1, wherein the input request is received from a single conditioning lever.

8. A turbopropeller engine, comprising the control system according to claim 1.

9. An electronic control system for a turbopropeller engine having a gas turbine and a propeller, coupled to the gas turbine, the control system comprising a propeller control unit and a turbine control unit configured to jointly control engine power output based on an input request,
wherein the propeller control unit comprises a first reference generator, configured to determine a reference propeller speed based on the input request, and a first regulator, configured to regulate a propeller speed,
wherein the propeller control unit further comprises a reference correction stage configured to correct the reference propeller speed and generate thereby a corrected reference propeller speed, and in that the first regulator is configured to regulate the propeller speed based on the corrected reference propeller speed to achieve optimized efficiency,
wherein the first regulator is configured to regulate a value of the propeller speed by causing a variation of a propeller blade angle, and wherein the reference correction stage of the propeller control unit further comprises:
a first and a second propeller-map processing blocks configured to determine the maximum efficiency and, respectively, the actual efficiency using a propeller performance map and, in case of the second processing block, an actual measured value for the propeller blade angle; and an optimizer block, configured to receive the efficiency error and to determine the reference speed correction for iterative correction of the reference propeller speed, such as to reduce the efficiency error below a threshold.

10. The control system according to claim 9, wherein the engine operating point is determined by measures of propeller speed and of engine torque or thrust, and the environmental parameters comprise a measure of an aircraft speed of an aircraft.

11. The control system according to claim 9, wherein the turbine control unit comprises a second reference generator, configured to determine a reference quantity based on the input request, and a second regulator, configured to regulate a fuel flow to the gas turbine; wherein the reference correction stage is further configured to correct the reference quantity and generate thereby a corrected reference quantity, and the second regulator is configured to regulate the fuel flow based on the corrected reference quantity.

12. The control system according to claim 11, wherein the input request is indicative of a power setting; and the corrected reference quantity is configured to compensate for correction of the propeller speed and thereby maintain the power setting while the propeller speed is corrected to achieve optimized efficiency.

13. The control system according to claim 11, wherein the reference quantity is the engine torque and the corrected reference quantity is a corrected reference engine torque.

14. The control system according to claim 11, wherein the reference quantity is the engine thrust and the corrected reference quantity is a corrected reference engine thrust.

15. The control system according to claim 9, wherein the input request is received from a single conditioning lever.

16. A control method for a turbopropeller engine, having a gas turbine and a propeller having a propeller speed, coupled to the gas turbine, the method comprising jointly controlling the propeller and the gas turbine to control engine power based on an input request,
wherein controlling the propeller comprises generating a reference propeller speed based on the input request, and regulating the propeller speed,
wherein controlling the propeller further comprises applying a correction to the reference propeller speed to generate thereby a corrected reference propeller speed, and in that regulating comprises regulating the propeller speed based on the corrected reference propeller speed, to achieve an optimized efficiency,
wherein applying a correction to the reference propeller speed comprises determining an available maximum efficiency and an actual efficiency, based on a measured engine operating point and environmental parameters, and iteratively determining the corrected reference propeller speed based on minimization of an efficiency error being a function of a difference between the maximum efficiency and actual efficiency values.

17. The control method according to claim 16, wherein regulating the propeller speed comprises causing a variation of a propeller blade angle, and wherein applying a correction to the reference propeller speed further comprises determining the maximum efficiency and, respectively, the actual efficiency using a propeller performance map and, in case of the actual efficiency, a measured value for the propeller blade angle.

18. The control method according to claim 17, wherein controlling the turbine comprises determining a reference quantity based on the input request and regulating a fuel flow in the gas turbine as a function of the reference quantity; wherein applying a correction to the reference propeller speed further comprises applying a correction to the reference quantity and generating thereby a corrected reference quantity, and regulating comprises regulating the fuel flow based on the corrected reference quantity.

19. The control method according to claim 18, wherein the input request is indicative of a power setting; and the corrected reference quantity is configured to compensate for correction of the propeller speed and thereby maintain the power setting while the propeller speed is corrected to achieve optimized efficiency.

20. The control method according to claim 18, wherein the reference quantity is the engine torque or thrust, and the corrected reference quantity is a corrected reference engine torque or thrust.

* * * * *